Inventor
Oscar C. Blomgren, Jr.
By Kinzer, Dorn & Zickert
Attorneys

United States Patent Office 3,697,411
Patented Oct. 10, 1972

3,697,411
ELECTROSTATIC FUEL FILTER
Oscar C. Blomgren, Jr., Lake Bluff, Ill., assignor to Inter-Probe, Inc., Chicago, Ill.
Filed Dec. 14, 1970, Ser. No. 97,626
Int. Cl. B01d 13/02; B03c 5/00
U.S. Cl. 204—302
5 Claims

ABSTRACT OF THE DISCLOSURE

A device for separating or filtering water from fuel including a container or vessel into which is received an emulsion or mixture of water and fuel, wherein the container includes a body of electrically insulating material and a cover member of electrically conductive material, and wherein the cover is connected to ground potential, and an electrode or probe to which is supplied a high voltage direct current potential arranged adjacent to or in engagement with the body of insulation material at a point generally opposite the position of the cover member.

---

Figure 1:
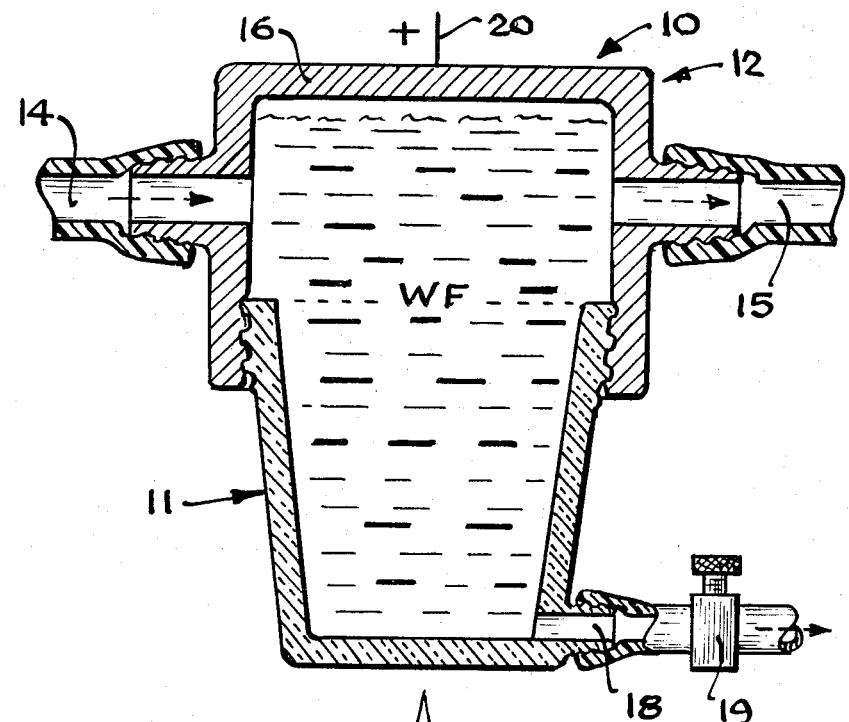

This invention relates in general to an electrostatic fuel filter for filtering water from fuel, and more particularly to a device for separating water from fuel, whereby a mixture or emulsion of water and fuel fed through a container or vessel is subjected to a separation process by the external application of electrostatic energy.

The filter of the present invention is especially useful in connection with engines requiring fuel free of water to accomplish efficient combustion, but may also be used in fuel tank farms, fuel tank trucks, or vehicles using fuel. It is well known that water in fuel produces combustion problems which reduce the efficiency of an engine, and can even be dangerous where it may cause flame-outs in jet engines. It is well known that gravitational separation is not possible in the presence of vibration encountered on engines. Moreover, it is known that water contains other contaminants which will clog heretofore known fuel filters and even stop fuel flow. Therefore, it is important to separate the water from the fuel prior to feeding the fuel to an engine.

The fuel filter of the present invention electrostatically separates water from fuel to provide a water-free fuel for an engine thereby enhancing engine operation. The filter may be used in fuel tank farms, fuel tank trucks, or in engine fuel lines. Separation is effected continuously as fuel is delivered to an engine by means of a container or vessel through which the fuel and any water mixed or emulsified therewith may pass and within which water separation can be effected so that the water can be stripped from the fuel even though the container may be subjected to vibration. The container includes a body of electrically insulating material with a cover made of electrically conductive material. An inlet to the container will supply the fuel from a tank, while an outlet will deliver the fuel water-free to the engine. Means is provided on the container for stripping off water separated from the fuel, the separation resulting from subjecting the emulsion or mixture of water and fuel to an external electrostatic field. The field is generated by connecting the cover member to ground potential, and supplying a high voltage potential of direct current to an electrode or probe directed toward the body of insulating material. Accordingly, since no electrode is in direct contact with the fuel, there is no danger of fire, explosion or electrolysis. Any suitable means may be provided for supplying the high voltage potential. Application of the electrostatic field immediately causes separation of the water and fuel, where the water goes to the bottom of the container and can there be easily drawn off. The time necessary to allow separation of water and oil gravitationally is substantially longer, and not even possible under vibration, and therefore not practical when concerned with filtering water from a fuel. For example, gravitational separation of water from diesel fuel under non-vibrating conditions will take about 90 seconds, while separation according to the present invention will take no more than one or two seconds.

It is therefore an object of the present invention to provide a new and improved filter for separating water from fuel.

Another object of the present invention is in the provision of an electrostatic fuel filter, wherein the fuel and any water mixed or emulsified therewith is subjected to an external electrostatic field, thereby separating the water from the fuel and enabling the stripping off of the water.

A further object of the present invention resides in the provision of an electrostatic fuel filter that subjects the fuel to an external electrostatic field, without producing any danger of fire, explosion or electrolysis.

A still further object of this invention is to provide a fuel filter for filtering water from fuel in tank farm, tank truck and vehicle installations.

Another object of this invention is in the provision of an electrostatic fuel filter for engines that strips off water thereby enhancing fuel combustion and engine efficiency.

Figure 2:
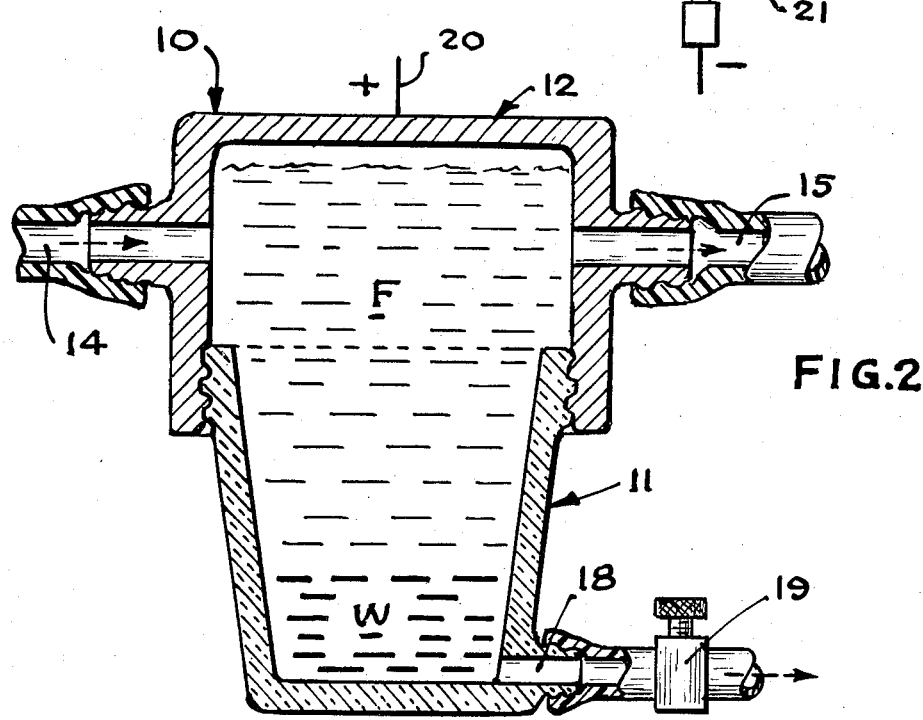

Other objects, features and advantages of the invention will be apparent from the following detailed disclosure, taken in conjunction with the accompanying sheet of drawing wherein like reference numerals refer to like parts, in which:

FIG. 1 is a vertical sectional view taken through a fuel filter according to the invention, showing some parts diagrammatically for purposes of simplicity, and demonstrating the condition of the fuel or oil and water when it is in mixed or emulsion form, all prior to the application of the external electrostatic field; and FIG. 2 is similar to FIG. 1, but illustrates the separating of the fuel and water resulting from the application of an external electrostatic field to the fuel and water mixture or emulsion.

Referring now to the drawings, the electrostatic fuel filter according to the invention is illustrated in one form, wherein a fuel separation container or vessel 10 is adapted to be arranged in a fuel line ahead of the engine of the vehicle or in tank farm or tank truck operation for the purpose of removing water from the fuel and enhancing fuel combustion. The fuel separation container includes a body 11 made of electrically insulative material, such as glass or the like, and a cover member 12 made of an electrically conductive material, such as metal suitably screw-threaded on to the body 11.

The cover member 12 includes an inlet 14 and an outlet 15, the inlet being connected to a suitable source of fuel, and the outlet being connected to the engine being supplied with fuel for combustion purposes. The fuel may be diesel oil which is used for diesel engines, jet engine fuel, or any other liquid fuel having a specific gravity less than that of water. The cover member 12 includes a top wall 16 having a ground potential wire 20 suitably connected thereto. The outlet 15 of the container 10, together with the inlet 14 are built into the cover member 12, but it should be appreciated that they can be otherwise formed and arranged such as by being built into the body 11.

At the lower end of the body 11, a water stripping outlet 18 serves to strip off any water separated from the fuel, as such will immediately go to the bottom of the container. A valve 19 is associated with the water stripping outlet 18 to permit selective stripping of the water manually or automatically.

The top wall 16 of the cover member 12 is suitably connected to ground potential through a wire 20, while a needle-like probe 21 is arranged at the opposite end of the container to coact with the ground potential and create an electrostatic field across the contents of the container 10. The electrode 21 may suitably be supplied with a direct current potential of about 35,000 kilovolts and 100 microamps, although between 20 and 40 kilovolts may be use. As seen in FIG. 1, the water and fuel comprise a mixture or an emulsion WF, while FIG. 2 illustrates the separation with the fuel rising to the top which immediately follows the application of the potential, the water being designated W and the fuel being designated F.

While the electrode 21 is illustrated as being connected to a high voltage negative potential, and the cover member is illustrated connected to a positive ground potential, it should be recognized that the cover member could be connected to a negative ground potential, while the electrode 21 could be connected to a high voltage positive potential. Any suitable power supply may be employed to provide the necessary potential.

It should be appreciated that in an engine-powered automobile or other vehicle, the high electrical potential could be taken from an ignition coil, although it may be provided by any suitable means. Even with the use of the high potential in the proximity of a volatile fuel, it will be understood that there is no danger of fire or explosion, as the fuel is not exposed directly to the electrodes. Further, the use of an externally generated electrostatic field will not generate any electrolysis which might otherwise be dangerous and cause need for constant replacement of electrodes.

It will be understood that modifications and variations may be effected without departing from the scope of the novel concepts of the present invention, but it is understood that this application is to be limited only by the scope of the appended claims.

This invention is hereby claimed as follows:

1. An electrostatic fuel filter for separating water from fuel comprising, a container including a body of insulating material and a cover of electrically conductive material, said container having a fuel outlet, a fuel inlet and a water stripping drain, means applying ground potential to the cover, an electrode adjacent the outside of the body opposite the cover, and means applying a high voltage, low amperage direct current potential to the electrode of a magnitude such that separation of fuel and water takes place substantially simultaneously.

2. An electrostatic fuel filter as defined in claim 1, wherein the high voltage applied to the electrode is of negative polarity and the ground potential is of positive polarity.

3. An electrostatic fuel filter as defined in claim 1, wherein the high voltage applied to the electrode is of positive polarity and the ground potential is of negative polarity.

4. An electrostatic fuel filter as defined in claim 1, wherein the high voltage potential is between 20 and 40 kv.

5. An electrostatic fuel filter as defined in claim 1, wherein the water stripping drain is at the bottom of the container.

References Cited
UNITED STATES PATENTS 1,838,937   12/1931   Girvin _____ 204—302

TA-HSUNG TUNG, Primary Examiner

T. TUFARIELLO, Assistant Examiner

U.S. Cl. X.R.

204—188